(12) United States Patent
Niemi et al.

(10) Patent No.: US 10,111,274 B2
(45) Date of Patent: Oct. 23, 2018

(54) HANDLING OF REGISTRATION REJECT IN MOBILE COMMUNICATIONS

(71) Applicant: MediaTek Singapore Pte. Ltd., Singapore (SG)

(72) Inventors: Marko Niemi, Oulu (FI); Matti Moisanen, Oulu (FI)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 15/152,373

(22) Filed: May 11, 2016

(65) Prior Publication Data
US 2016/0255674 A1    Sep. 1, 2016

Related U.S. Application Data

(60) Provisional application No. 62/246,765, filed on Oct. 27, 2015.

(51) Int. Cl.
*H04W 76/18* (2018.01)
*H04W 76/02* (2009.01)
*H04W 60/04* (2009.01)

(52) U.S. Cl.
CPC ........... *H04W 76/18* (2018.02); *H04W 60/04* (2013.01); *H04W 76/027* (2013.01)

(58) Field of Classification Search
CPC .... H04W 76/027; H04W 60/04; H04W 48/18
See application file for complete search history.

(56) References Cited

U.S. PATENT DOCUMENTS

| 2009/0104906 A1* | 4/2009 | Lee ........................ H04W 74/08 455/435.1 |
| 2011/0268092 A1* | 11/2011 | Tiwari ................... H04W 60/02 370/335 |
| 2012/0178457 A1* | 7/2012 | Liao ..................... H04W 76/027 455/437 |
| 2012/0225670 A1* | 9/2012 | Cheng ................... H04W 60/00 455/456.2 |
| 2013/0316699 A1* | 11/2013 | Jheng ..................... H04W 48/18 455/423 |
| 2014/0045488 A1* | 2/2014 | Cheng ................... H04W 24/00 455/423 |
| 2014/0141782 A1* | 5/2014 | Rantala ............. H04W 36/0066 455/436 |

* cited by examiner

*Primary Examiner* — Kathy Wang-Hurst
*Assistant Examiner* — Ernest Tacsik
(74) *Attorney, Agent, or Firm* — Han IP PLLC; Andy M. Han

(57) ABSTRACT

Various solutions to handling of registration rejects with respect to user equipment (UE) in mobile communications are described. A UE may transmit a first request to a first network element of a wireless network. The UE may receive a first reject from the first network element. The UE may bar the first network element in response to receiving the first reject from the first network element. The UE may transmit a second request to a second network element of the same wireless network or a different wireless network in response to receiving the first reject from the first network element. Alternatively, the UE may transmit a second request to the first network element after a period of barring time.

15 Claims, 9 Drawing Sheets

HANDLING OF REGISTRATION REJECT IN MOBILE COMMUNICATIONS

CROSS REFERENCE TO RELATED PATENT APPLICATION

The present disclosure claims the priority benefit of U.S. Provisional Patent Application No. 62/246,765, filed on 27 Oct. 2015, which is incorporated by reference in its entirety.

TECHNICAL FIELD

The present disclosure is generally related to mobile communications and, more particularly, to handling of registration rejects with respect to user equipment in mobile communications.

BACKGROUND

Unless otherwise indicated herein, approaches described in this section are not prior art to the claims listed below and are not admitted to be prior art by inclusion in this section.

There is vulnerability in the specifications of the $3^{rd}$ Generation Partnership Project (3GPP) in that a denial of service attack against mobile terminals (herein interchangeably referred to as user equipment (UE)) from a fraudulent/rogue network is possible due to lack of ability to proceed mutual authentication and integrity protection. Therefore, it is evident that UE cannot, in every case, be sure about the reliability of the network to which the UE is accessing or attempting to access. One way to verify the reliability is mutual authentication procedure but this may not be possible. For instance, when the Subscriber Identify Module (SIM) card of the UE is indeed invalid, or when the network cannot access the subscriber's Home Public Land Mobile Network (HPLMN), mutual authentication is not a viable option. Thus, in some cases rejects received from a network cannot be trusted.

In certain cases, where a Universal Subscriber Identify Module (USIM) is indeed valid, a fraudulent network element may send non-integrity protected reject message(s) with certain reject cause to the UE and, at reception of that reject cause, the UE shall consider the USIM invalid. This means that the UE, even with a valid USIM, can be getting out of service by the fraudulent network element. Under one approach, an attempt to correct this problem was that the UE is never to consider the USIM permanently invalid if the reject was received without integrity protection. However, this approach may cause even more serious problems in cases where a UE equipped with an invalid USIM does not obey the reject from the network element but, rather, keeps on attempting to obtain service, thereby causing unnecessary signaling towards the network until the UE's battery dies. With certain other reject causes received from a fraudulent network element, a UE with a valid USIM shall consider that it is not able to obtain service from the networks even if it should be based on its subscription.

Under another approach, an existing timer (e.g., timer T3245) or a new timer (e.g., timer T3445) may be utilized to account for a "back-off" time. The timer would be started if a reject cause is received unauthenticated. The UE would be completely blocked for a period of time from 15 minutes to 48 hours. If a fatal cause is received and in case of less fatal cause(s), the Public Land Mobile Network (PLMN) may be forbidden until the timer has expired. If a fraudulent/rogue cell pretends to be a cell from the HPLMN, the UE would continue its attempt to establish communication sessions with this fraudulent/rogue cell. Least fatal values may keep the UE on the cell and restrict the UE from selecting any other cell or PLMN. A real HPLMN would authenticate the UE but the fraudulent/rogue cell would not. Also, at the expiry of the timer, the UE may still select the same cell (albeit rogue yet unbeknownst to the UE) again, and the UE may not be able to select other cell(s).

A different approach follows the existing cell barring mechanism so that a fraudulent/rogue cell can be barred for a period of time such as 5 minutes. During this period of barring time, the UE may be able to select another suitable cell. During the barring time, the fraudulent/rogue cell is excluded from being a candidate for cell selection and re-selection procedure. However, it is possible that the UE may return back to the fraudulent/rogue cell due to the fraudulent/rogue cell regaining the status of a suitable cell for selection/re-selection at the end of the barring time. If the denial of service is well mounted, the UE may again bar the fraudulent/rogue cell and the above process repeats. This "ping-ponging" issue may happen in case of the UE returns back to the fraudulent/rogue cell at every expiry of the 5-minute barring time.

Under yet another approach, when the SIM is indeed invalid, authentication is not possible and the network would send reject(s) non-integrity protected. However, under this approach, the UE would not consider the SIM invalid and, instead, would start a timer and attempt the procedure again and again.

SUMMARY

The following summary is illustrative only and is not intended to be limiting in any way. That is, the following summary is provided to introduce concepts, highlights, benefits and advantages of the novel and non-obvious techniques described herein. Selected, not all, implementations are further described below in the detailed description. Thus, the following summary is not intended to identify essential features of the claimed subject matter, nor is it intended for use in determining the scope of the claimed subject matter.

An objective of the present disclosure is to provide solutions that avoid or otherwise alleviate problems associated with existing approaches. In implementations in accordance with the present disclosure, the UE may remember that it has received a reject from a particular network and that if the UE receives the same reject once or certain number of times again it may not continue the same procedure again and again. Rather, the UE may remember that it has received the same reject once or certain number of times already and may consider the reject genuine. The UE may also consider its USIM invalid with certain cause values (e.g., cause #3). This principle of remembering previous rejects may be applicable to the handling of any of the non-integrity protected rejects such as, for example and not limited to, tracking area update (TAU), routing area update (RAU), attach, service and authentication rejects.

In one example implementation, a method may involve transmitting a first request to a first network element of a first type of wireless network. The method may also involve receiving a first reject from the first network element. The method may further involve barring the first network element in response to receiving the first reject from the first network element. The method may additionally involve transmitting a second request to a second network element of the first type of wireless network in response to receiving the first reject from the first network element.

In another example implementation, a method may involve transmitting a first request to a first network element of a first type of wireless network. The method may also involve receiving a first reject from the first network element. The method may further involve barring the first network element for a period of barring time in response to receiving the first reject from the first network element. The method may additionally involve transmitting a second request to the first network element after the period of barring time.

In yet another example implementation, a method may involve transmitting a first request to a first network element of a first wireless network. The method may also involve receiving a first reject from the first network element. The method may further involve barring a tracking area, a routing area or a location area associated with the first network element or the first wireless network in response to receiving the first reject from the first network element. The method may additionally involve starting a back-off timer and transmitting a second request to a second network element of a second wireless network either immediately or after the period of barring time.

In still another example implementation, an apparatus may include a memory configured to store data, a communication unit configured to transmit and receive wireless signals, and a processor coupled to the memory and the communication unit. The processor may be configured to perform a number of operations including: transmitting, via the communication unit, a first request to a first network element of a first type of wireless network; receiving, via the communication unit, a first reject from the first network element; and barring the first network element in response to receiving the first reject from the first network element.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Overview

Figure 1:
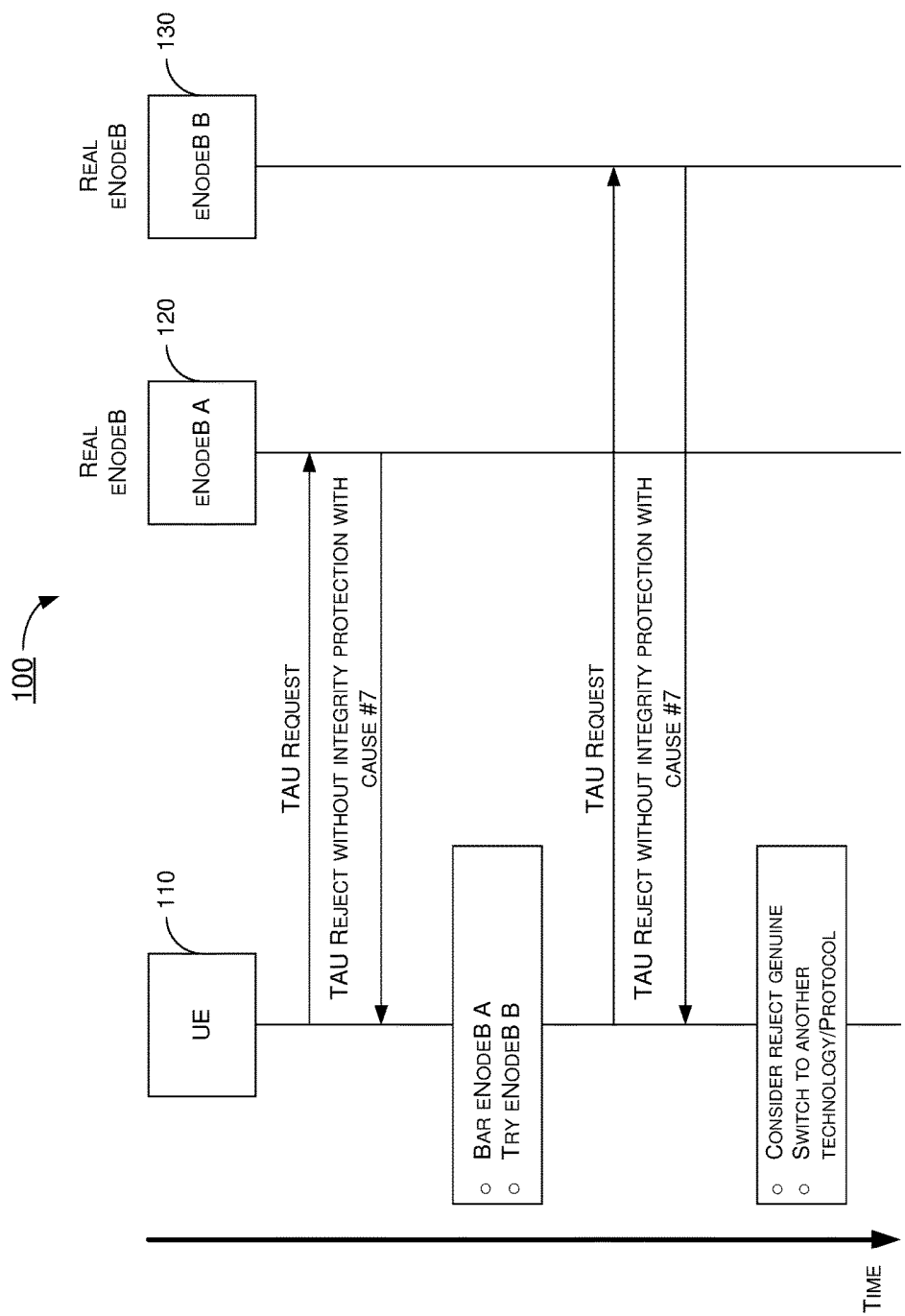
FIG. 1 is a diagram of a first example scheme in accordance with an implementation of the present disclosure.

Implementations in accordance with the present disclosure relate to various techniques, methods, schemes and/or solutions pertaining to the handling of registration rejects with respect to user equipment in mobile communications. According to the present disclosure, a number of possible solutions may be implemented separately or jointly. That is, although these possible solutions may be described below separately, two or more of these possible solutions may be implemented in one combination or another.

In a first solution according to the present disclosure, instead of starting a back-off timer (e.g., timer T3346 or timer T3245), the UE may stop attempting registration with an operator's network after receiving a reject from a first cell. Moreover, the UE may bar the first cell. The UE may undergo a procedure similar to that utilized when the network fails the authentication check by USIM. Afterwards, the UE may select a second cell, possibly in the same operator's network, and reattempt registration with the second cell. In an event that the first cell was fraudulent, the UE may succeed in registration with the second cell which is a real network cell. In an event that the reject from the first cell is real (e.g., SIM of the UE is invalid), the UE may receive the same reject from the second cell as well. In such case the UE may consider the rejects genuine, and the UE may undertake one or more of the following solutions.

In a second solution according to the present disclosure, the UE may count the number of times it has received a reject from a particular cell and, after the count reaches a predefined threshold, the UE may consider the rejects genuine. This may be useful especially in cases where the UE cannot select another cell, as the back-off timer expires the UE may attempt to obtain service in the same cell. This solution may be incorporated into (utilized in conjunction with) the first solution described above and/or a third solution described below.

In a third solution according to the present disclosure, the UE may consider from which cell(s) it has received reject(s) and, in an event that several different cells have sent the same reject, the UE may consider the reject genuine. In some implementations, after receiving the first reject from a given cell, the UE may select another cell according to one or more of the following options. As a first option, the UE may select one or more cells from the same PLMN or from one or more other PLMNs. As a second option, the UE may select one or more cells from one or more different telecommunications systems such as, for example and not limited to, Global System for Mobile Communications (GSM), Universal Mobile Telecommunications System (UMTS), Wideband Code Division Multiple Access (WCDMA) and Long-Term Evolution (LTE). As a third option, the UE may attempt to select a cell which would appear to be the fraudulent cell (e.g., based on the cell ID, PLMN and/or system) but that may be considered different by one or more metrics. As a fourth option, the UE may consider its location (e.g., according to Global Positioning System (GPS)) and, when the UE is out of coverage area of the fraudulent cell, the UE may select a new cell and attempt registration with the new cell. As the fraudulent cell may not be able to simulate many different cells, this third solution may be especially helpful. For instance, in an event that the reject is received from the fraudulent cell and not from another cell, the UE may survive the denial of service attack and obtain service from another cell/network.

In a fourth solution according to the present disclosure, the UE may remember the cell or the PLMN from which it has received a reject, and the UE may consider the reject valid on that cell or PLMN and behave accordingly whenever the UE is camped on or otherwise within the coverage area of that cell or PLMN. The UE may also store and remember one or more cell-and-reject pairs and/or one or more PLMN-and-reject pairs in order to control its behavior when in the coverage area of such cell(s) and/or PLMN(s). The UE may attempt registration again after leaving the cell or PLMN from which it has received a reject. Afterwards, the UE may apply the second solution and the third solution described above to decide when to consider the reject final. This fourth solution may be especially useful when only one cell or PLMN is available at a time so as to avoid a large number of consecutive retries of registration on that cell or PLMN.

In a fifth solution according to the present disclosure, a network operator may preserve all the subscription data that the network operator has ever had, even if a subscription has been closed. In this way the network operator may be able to authenticate invalid USIMs and send all reject causes integrity protected. This fifth solution may not be helpful for all cases. For example, this fifth solution may not be applicable to old and deleted subscriptions and non-operator USIMs such as those used by test equipment vendors.

FIG. 1 illustrates a first example scheme 100 in accordance with an implementation of the present disclosure. Scheme 100 may be an example depiction of the first solution described above in which the reject is genuine (e.g., certain services such as GPRS/EPS services not allowed for the UE in concern). Scheme 100 may involve a UE 110, a first network element 120 (labeled as "eNodeB A" in FIG. 1) and a second network element 130 (labeled as "eNodeB B" in FIG. 1). In scheme 100 each of first network element 120 and second network element 130 may be a real eNodeB and not a fraudulent or rogue eNodeB. Under scheme 100, UE 110 may be in the tracking area (TA) where two or more suitable cells are available such as, for example and not limited to, cells associated with first network element 120 and second network element 130. Both first network element 120 and second network element 130 may be of a first type of wireless network.

As shown in FIG. 1, UE 110 may attempt to register with a first cell by transmitting a request (e.g., TAU request, RAU request, service request or location update request) to a core network via first network element 120, and may receive, from first network element 120, a reject (e.g., TAU reject, RAU reject, service reject or location update reject) without integrity protection (e.g., reject with cause #7). According to the present disclosure, UE 110 may bar first network element 120 in response to receiving the reject from first network element 120, and may attempt to register with another cell (e.g., a second cell associated with second network element 130).

In some implementations, UE 110 may select another cell by selecting a cell from the same or other PLMNs. Alternatively or additionally, UE 110 may select another cell from a different system (e.g., GSM/GERAN, UMTS/UTRAN, WCDMA or LTE). Alternatively or additionally, UE 110 may select another cell which may look like first cell (which may be a fraudulent cell) that may be considered different by one or more metrics. Alternatively or additionally, UE 110 may consider its location (e.g., using GPS information) and when it is out of coverage area of first cell to determine when to select a new cell to reattempt registration.

As shown in FIG. 1, upon selecting second cell associated with second network element 130, UE 110 may transmit a request (e.g., TAU request) to the core network via second network element 130, and may receive, from second network element 130, a reject (e.g., TAU reject) without integrity protection (e.g., reject with cause #7). According to the present disclosure, UE 110 may consider the rejects received to be genuine. In response to receiving the rejects from first network element 120 and second network element 130, UE 110 may also switch to communications with a second type of wireless network different from first type of wireless network (e.g., switching from $4^{th}$ Generation (4G) wireless networks to $2^{nd}$ Generation (2G) or $3^{rd}$ Generation (3G) wireless networks).

It is noteworthy that, although the example shown in FIG. 1 may pertain to TAU requests and TAU rejects, scheme 100 may also be applicable to other types of requests and rejects such as, for example and not limited to, RAU requests/rejects, attach requests/rejects, service requests/rejects, location update requests/rejects and/or authentication requests/rejects. Moreover, it is noteworthy that, although the example shown in FIG. 1 may pertain to a LTE system with eNodeB, scheme 100 may also be applicable to other types of wireless networks such as, for example and not limited to, GSM/GERAN, UMTS/UTRAN.

Figure 2:
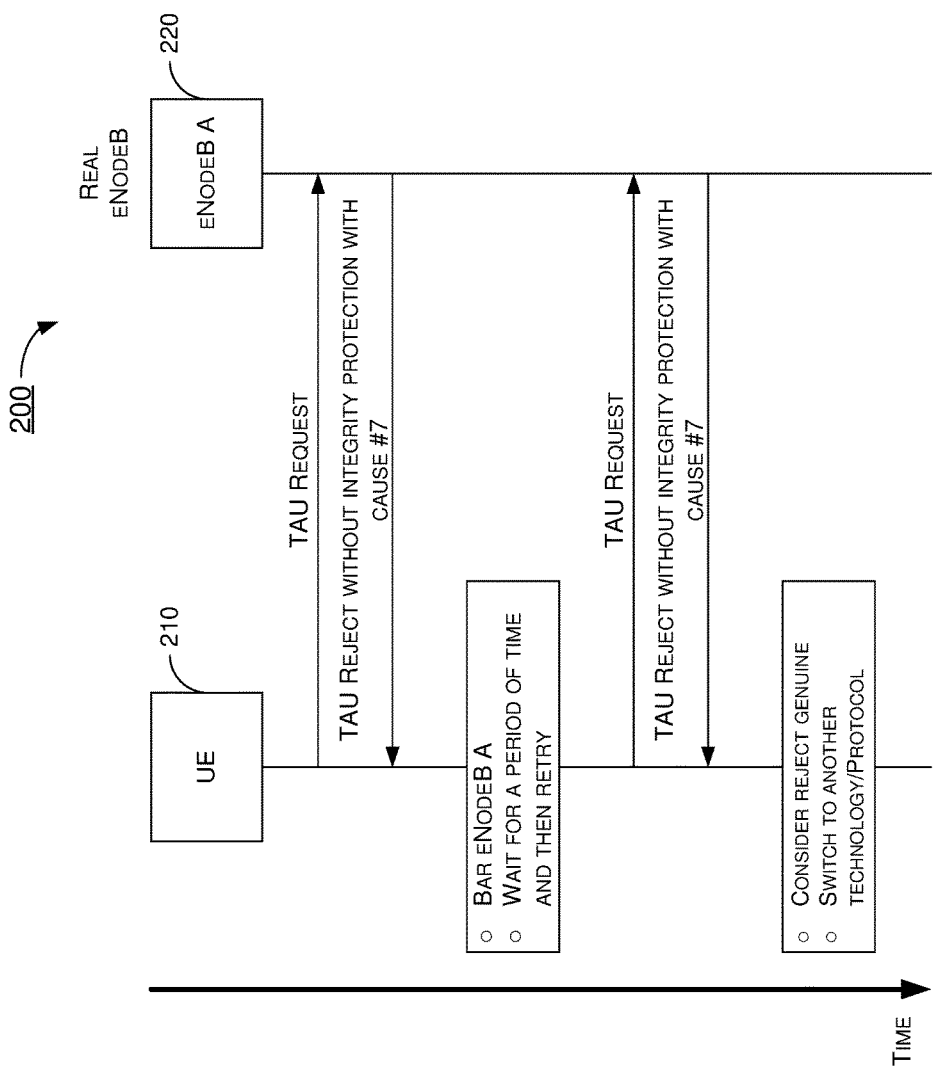
FIG. 2 is a diagram of a second example scheme in accordance with an implementation of the present disclosure.

FIG. 2 illustrates a second example scheme 200 in accordance with an implementation of the present disclosure. Scheme 200 may be an example depiction of the second solution described above in which the reject is genuine (e.g., certain services such as GPRS/EPS services not allowed for the UE in concern). Scheme 200 may involve a UE 210 and a network element 220 (labeled as "eNodeB A" in FIG. 2). In scheme 200 network element 220 may be a real eNodeB and not a fraudulent or rogue eNodeB. Under scheme 200, UE 210 may be in the tracking area (TA) where there is one suitable cell available such as, for example and not limited to, the cell associated with network element 220. Network element 220 may be of a first type of wireless network.

As shown in FIG. 2, UE 210 may attempt to register with the cell by transmitting a request (e.g., TAU request) to a core network via network element 220, and may receive, from network element 220, a reject (e.g., TAU reject) without integrity protection (e.g., reject with cause #7). According to the present disclosure, UE 210 may bar network element 220 in response to receiving the reject from network element 220. UE 210 may also wait for a period of wait time (e.g., 5 minutes) before reattempting to establish communications with the core network via network element 220. After the passage of the period of wait time, UE 210 may transmit another request (e.g., TAU request) to the core network via network element 220, and may receive, from network element 220, another reject (e.g., TAU reject) without integrity protection (e.g., reject with cause #7). In response to receiving the rejects from network element 220, UE 210 may consider the rejects received to be genuine. UE 210 may also switch to communications with a second type of wireless network different from first type of wireless network (e.g., switching from 4G wireless networks to 2G or 3G wireless networks).

It is noteworthy that, although the example shown in FIG. 2 may pertain to TAU requests and TAU rejects, scheme 200 may also be applicable to other types of requests and rejects such as, for example and not limited to, RAU requests/rejects, attach requests/rejects, service requests/rejects, location update requests/rejects and/or authentication requests/ rejects. Moreover, it is noteworthy that, although the example shown in FIG. 2 may pertain to a LTE system with eNodeB, scheme 200 may also be applicable to other types of wireless networks such as, for example and not limited to, GSM/GERAN, UMTS/UTRAN.

Figure 3:
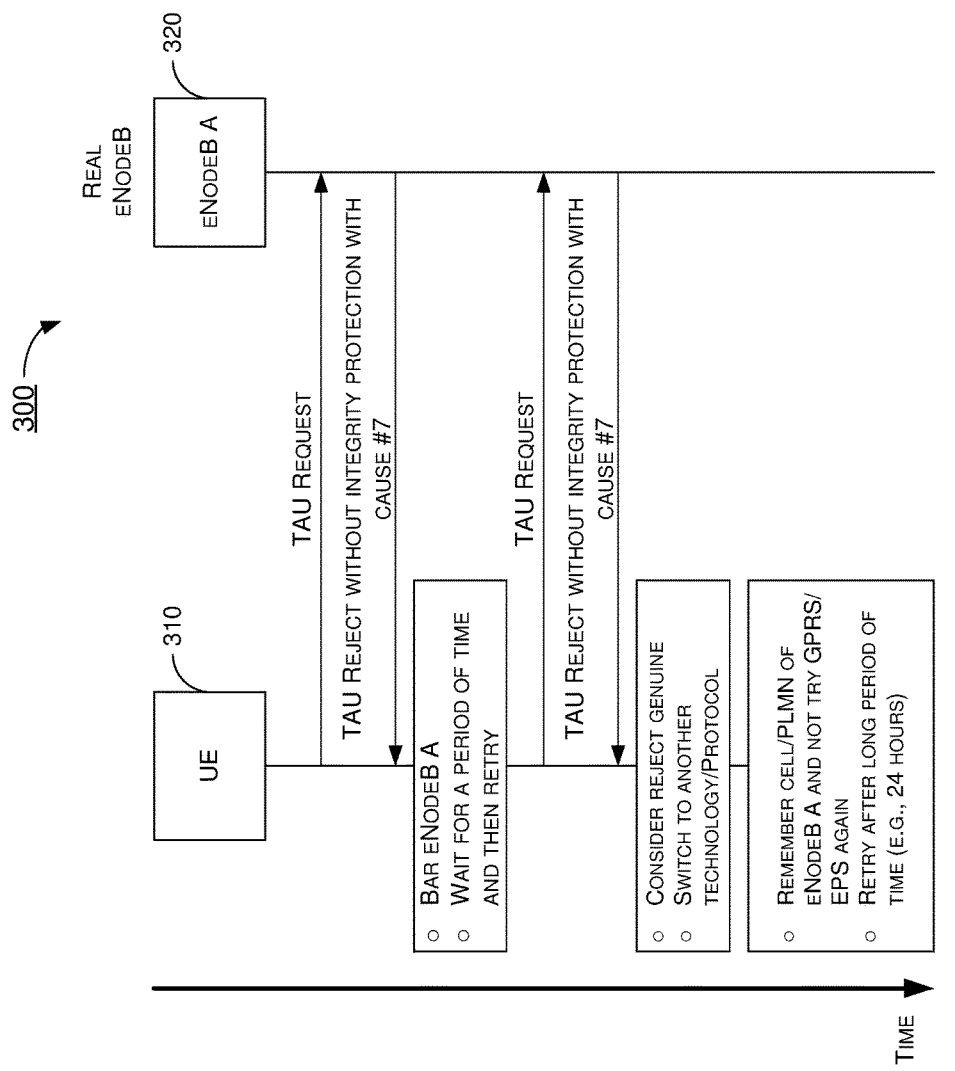
FIG. 3 is a diagram of a third example scheme in accordance with an implementation of the present disclosure.

FIG. 3 illustrates a third example scheme 300 in accordance with an implementation of the present disclosure. Scheme 300 may be an example depiction of a combination of the second solution and the fourth solution described above in which the reject is genuine (e.g., certain services such as GPRS/EPS services not allowed for the UE in concern). Scheme 300 may involve a UE 310 and a network element 320 (labeled as "eNodeB A" in FIG. 3). In scheme 300 network element 320 may be a real eNodeB and not a fraudulent or rogue eNodeB. Under scheme 300, UE 310 may be in the tracking area (TA) where there is one suitable cell available such as, for example and not limited to, the cell associated with network element 320. Network element 320 may be of a first type of wireless network.

As shown in FIG. 3, UE 310 may attempt to register with the cell by transmitting a request (e.g., TAU request) to a core network via network element 320, and may receive, from network element 320, a reject (e.g., TAU reject) without integrity protection (e.g., reject with cause #7). According to the present disclosure, UE 310 may bar network element 320 in response to receiving the reject from network element 320. UE 310 may also wait for a period of wait time (e.g., 30 minutes) before reattempting to establish communications with the core network via network element 320. After the passage of the period of wait time, UE 310 may transmit another request (e.g., TAU request) to the core network via network element 320, and may receive, from network element 320, another reject (e.g., TAU reject) without integrity protection (e.g., reject with cause #7). In response to receiving the rejects from network element 320, UE 310 may consider the rejects received to be genuine. UE 310 may also switch to communications with a second type of wireless network different from first type of wireless network (e.g., switching from 4G wireless networks to 2G or 3G wireless networks).

Additionally, UE 310 may remember the cell and/or PLMN associated with network element 320 and not try to establish (e.g., with the GPRS/EPS) again. For instance, UE 310 may store an identification associated with network element 320 such that network element 320 is not selected again when UE 310 attempts to establish communications with the first type of wireless network again. UE 310 may also reattempt to establish communications with the core network after a relatively long period of time such as, for example, 24 hours.

It is noteworthy that, although the example shown in FIG. 3 may pertain to TAU requests and TAU rejects, scheme 300 may also be applicable to other types of requests and rejects such as, for example and not limited to, RAU requests/rejects, attach requests/rejects, service requests/rejects, location update requests/rejects and/or authentication requests/rejects. Moreover, it is noteworthy that, although the example shown in FIG. 3 may pertain to a LTE system with eNodeB, scheme 300 may also be applicable to other types of wireless networks such as, for example and not limited to, GSM/GERAN, UMTS/UTRAN.

Figure 4:
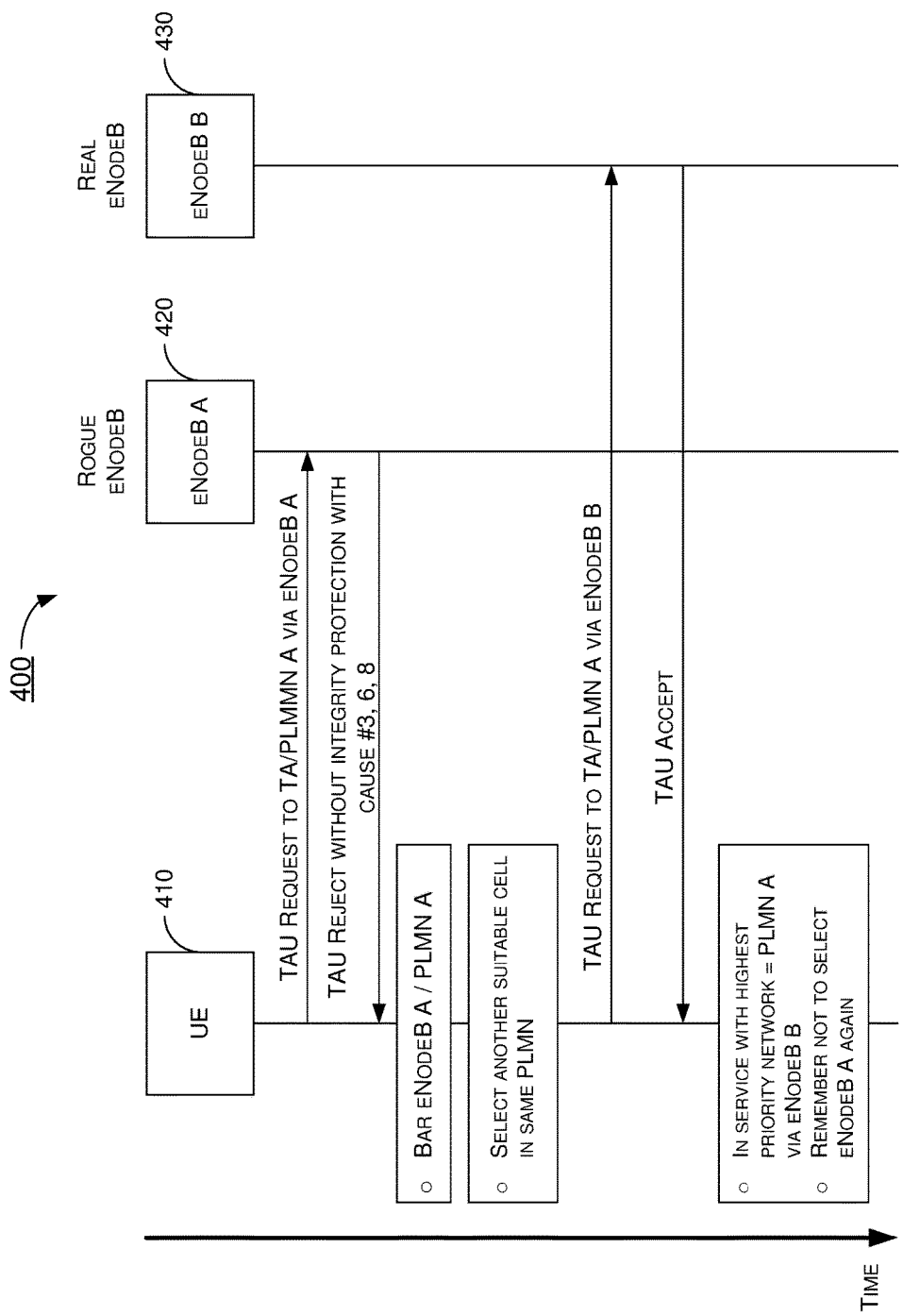
FIG. 4 is a diagram of a fourth example scheme in accordance with an implementation of the present disclosure.

FIG. 4 illustrates a fourth example scheme 400 in accordance with an implementation of the present disclosure. Scheme 400 may involve a UE 410, a first network element 420 (labeled as "eNodeB A" in FIG. 4) and a second network element 430 (labeled as "eNodeB B" in FIG. 4). In scheme 400 second network element 430 may be a real eNodeB while, on the other hand, first network element 420 may be a fraudulent or rogue eNodeB pretending to be a suitable cell of a PLMN (e.g., PLMN A) that is available in the same area with a real cell (e.g., the cell associated with second network element 430). Under scheme 400, first network element 420 may reject any request from UE 410 even though UE 410 may be valid. Both first network element 420 and second network element 430 may be of a first type of wireless network.

As shown in FIG. 4, UE 410 may attempt to register with a first cell by transmitting a request (e.g., TAU request) to a core network via first network element 420, and may receive, from first network element 420, a reject (e.g., TAU reject) without integrity protection (e.g., reject with cause #7). According to the present disclosure, UE 410 may bar first network element 420 and/or the PLMN associated with first network element 420 (e.g., PLMN A) in response to receiving the reject from first network element 420, and may attempt to register with another cell (e.g., a second cell associated with second network element 430).

In some implementations, UE 410 may select another cell by selecting a cell from the same or other PLMNs. Alternatively or additionally, UE 410 may select another cell from a different system (e.g., GSM, WCDMA or LTE). Alternatively or additionally, UE 410 may select another cell which may look like first cell (which may be a fraudulent cell) that may be considered different by one or more metrics. Alternatively or additionally, UE 410 may consider its location (e.g., using GPS information) and when it is out of coverage area of first cell to determine when to select a new cell to reattempt registration.

As shown in FIG. 4, upon selecting second cell associated with second network element 430, UE 410 may transmit a request (e.g., TAU request) to the core network via second network element 430, and may receive, from second network element 430, an acceptance indication. Subsequently, UE 410 may be in communications and in service with a highest-priority network (e.g., PLMN A) via second network element 430. UE 410 may remember not to select first network element 420 again. For instance, UE 410 may store an identification associated with first network element 410 such that first network element 410 is not selected again when UE 410 attempts to establish communications with the first type of wireless network again.

It is noteworthy that, although the example shown in FIG. 4 may pertain to TAU requests and TAU rejects, scheme 400 may also be applicable to other types of requests and rejects such as, for example and not limited to, RAU requests/rejects, attach requests/rejects, service requests/rejects, location update requests/rejects and/or authentication requests/rejects. Moreover, it is noteworthy that, although the example shown in FIG. 4 may pertain to a LTE system with eNodeB, scheme 400 may also be applicable to other types of wireless networks such as, for example and not limited to, GSM/GERAN, UMTS/UTRAN.

Figure 5:
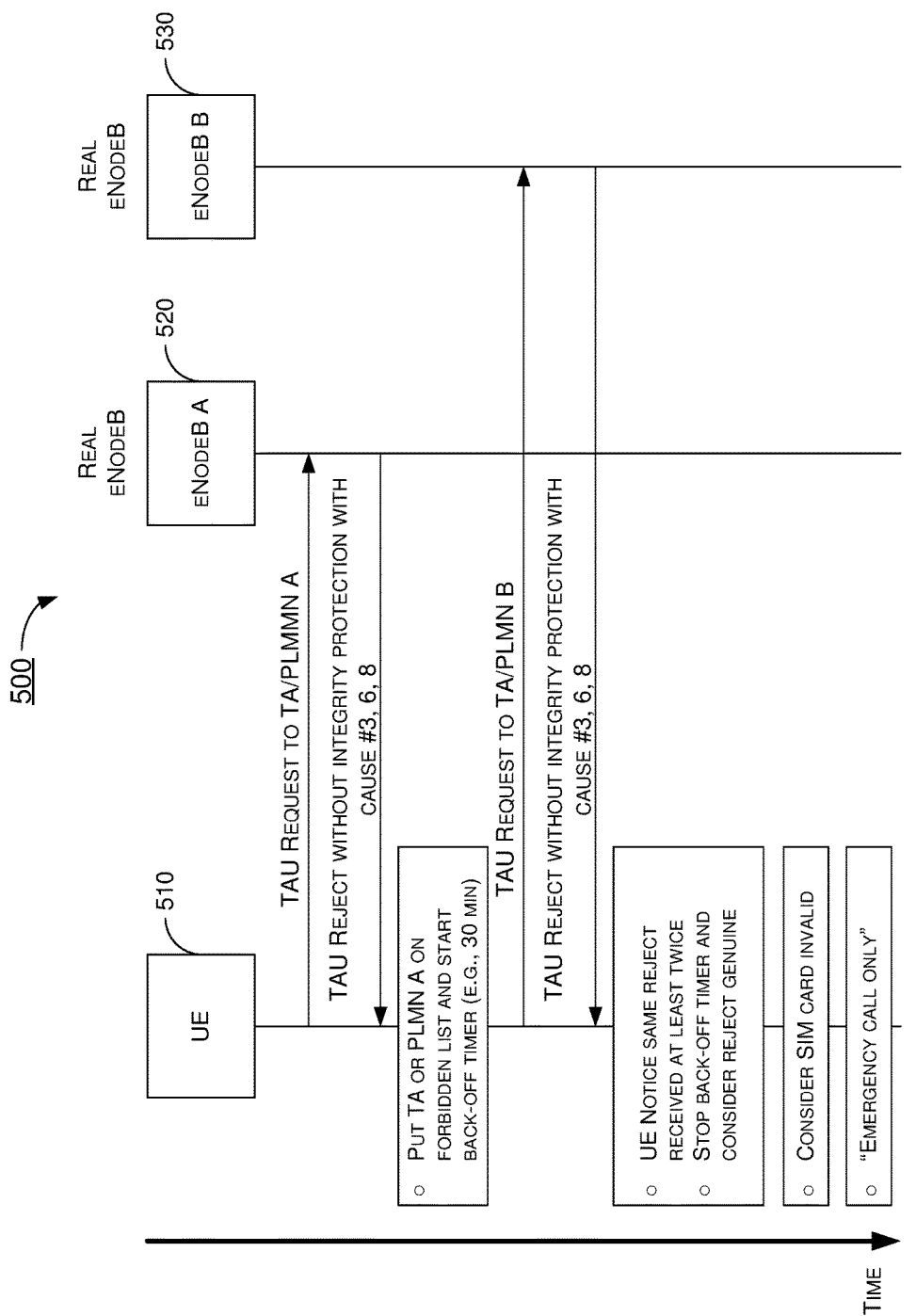
FIG. 5 is a diagram of a fifth example scheme in accordance with an implementation of the present disclosure.

FIG. 5 illustrates a fifth example scheme 500 in accordance with an implementation of the present disclosure. Scheme 500 may involve a UE 510, a first network element 520 (labeled as "eNodeB A" in FIG. 5) and a second network element 530 (labeled as "eNodeB B" in FIG. 5). In scheme 500 each of first network element 520 and second network element 530 may be a real eNodeB and not a fraudulent or rogue eNodeB. Under scheme 500, UE 510 may have an invalid SIM card and may receive genuine rejects from first network element 520 and second network element 530. Both first network element 520 and second network element 530 may be of a first type of wireless network.

As shown in FIG. 5, UE 510 may attempt to register with a first cell by transmitting a request (e.g., TAU request) to a core network via first network element 520, and may receive, from first network element 520, a reject (e.g., TAU reject) without integrity protection (e.g., reject with cause #3, 6 and/or 8). According to the present disclosure, UE 510 may bar first network element 520 in response to receiving the reject from first network element 520. For instance, UE 510 may place the TA and/or PLMN associated with first network element 520 (e.g., PLMN A) on a forbidden list. UE 510 may start a back-off timer which may expire after a predefined period of time, e.g., 30 minutes. UE 510 may also attempt to register with another cell (e.g., a second cell associated with second network element 530).

In some implementations, UE 510 may select another cell by selecting a cell from the same or other PLMNs. Alternatively or additionally, UE 510 may select another cell from a different system (e.g., GSM, WCDMA or LTE). Alternatively or additionally, UE 510 may select another cell which may look like first cell (which may be a fraudulent cell) that may be considered different by one or more metrics. Alternatively or additionally, UE 510 may consider its location (e.g., using GPS information) and when it is out of coverage area of first cell to determine when to select a new cell to reattempt registration.

As shown in FIG. 5, upon selecting second cell associated with second network element 530, UE 510 may transmit a request (e.g., TAU request) to the core network via second network element 530, and may receive, from second network element 530, a reject (e.g., TAU reject) without integrity protection (e.g., reject with cause #3, 6 and/or 8). According to the present disclosure, UE 510 may notice that it has received the same reject at least twice, and may consider the rejects to be genuine. Moreover, UE 510 may stop the back-off timer. Additionally, UE 510 may consider its SIM card invalid. Furthermore, UE 510 may enter an "emergency call only" mode in which UE 510 only allows emergency calls to be made.

It is noteworthy that, although the example shown in FIG. 5 may pertain to TAU requests and TAU rejects, scheme 500 may also be applicable to other types of requests and rejects such as, for example and not limited to, RAU requests/rejects, attach requests/rejects, service requests/rejects, location update requests/rejects and/or authentication requests/rejects. Moreover, it is noteworthy that, although the example shown in FIG. 5 may pertain to a LTE system with eNodeB, scheme 500 may also be applicable to other types of wireless networks such as, for example and not limited to, GSM/GERAN, UMTS/UTRAN.

Example Implementations

Figure 6:
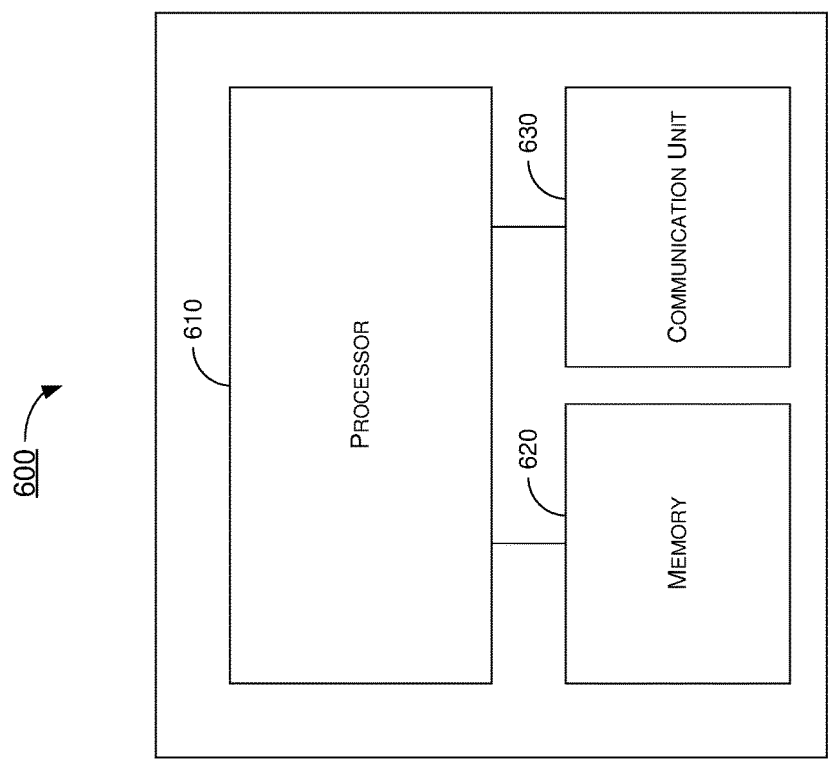
FIG. 6 is a block diagram of an example apparatus in accordance with an implementation of the present disclosure.

FIG. 6 illustrates an example apparatus 600 in accordance with an implementation of the present disclosure. Apparatus 600 may perform various functions to implement techniques, schemes, methods and solutions described herein. For instance, apparatus 600 may perform the multiple solutions and schemes 100-500 described above as well as processes 700-900 described below, whether individually or in any combination. In some implementations, apparatus 600 may be an electronic apparatus which may be a UE such as, for example, a smartphone, a mobile phone or any type of portable communications apparatus. In some implementations, apparatus 600 may be in the form of one or more integrated-circuit (IC) chip(s). Apparatus 600 may include one or more of those components shown in FIG. 6, such as a processor 610, a memory 620 and a communication unit 630. Apparatus 600 may include other component(s) not shown in FIG. 6 which may not be pertinent to the schemes, solutions, techniques and methods in accordance with the present disclosure and, thus, a description thereof is not provided. Processor 610 may be communicatively or otherwise operably coupled to memory 620 and communication unit 630. In some implementations, some or all of processor 610, memory 620 and communication unit 630 may be integral parts of a single IC chip. Alternatively, processor 610, memory 620 and communication unit 630 may be packaged as two or more separate and discrete IC chips.

Memory 620 may be configured to store data as well as one or more sets of processor-executable instructions. Memory 620 may include one or more computer-readable mediums such as a type of read-only memory (ROM) or random-access memory (RAM). For example, memory 620 may include a dynamic RAM (DRAM), static RAM (SRAM), thyristor RAM (T-RAM), zero-capacitor RAM (Z-RAM) or another type of volatile memory. As another example, memory device may include mask ROM, programmable ROM (PROM), erasable programmable ROM (EPROM), electrically-erasable programmable ROM (EEPROM), flash memory, solid-state memory or another type of non-volatile memory.

Communication unit 630 may include necessary hardware and/or software to perform wireless communications (e.g., transmit and receive wireless signals) with one or more external or remote devices such as, for example and not limited to, one or more eNodeB stations. For instance, under the control of processor 610, communication unit 630 may engage in wireless communications with one or more eNodeB stations to transmit requests and receive messages.

Processor 610 may be implemented in the form of a single IC chip or a chipset of multiple IC chips. Processor 610 may transmit, via communication unit 630, a first request to a first network element of a first type of wireless network. Processor 610 may also receive, via communication unit 630, a first reject from the first network element. Processor 610 may further bar the first network element in response to receiving the first reject from the first network element.

In some implementations, processor 610 may be configured to further perform a number of other operations. For instance, processor 610 may transmit, via communication unit 630, a second request to a second network element of the first type of wireless network in response to receiving the first reject from the first network element. Processor 610 may also receive, via communication unit 630, a second reject from the second network element. Processor 610 may further switch to communications with a second type of wireless network in response to receiving the first and the second rejects.

Alternatively or additionally, processor 610 may be configured to further perform a number of other operations. For instance, processor 610 may transmit, via communication unit 630, a second request to a second network element of the first type of wireless network in response to receiving the first reject from the first network element. Processor 610 may also receive, via communication unit 630, an acceptance indication from the second network element. Processor 610 may further store, in the memory, an identification associated with the first network element such that first network element is not selected again when attempting to establish communications with the first type of wireless network again. In some implementations, the first network element may be a first eNodeB of a first PLMN, and the second network element may be a second eNodeB of the first PLMN.

In some implementations, the first request may include a first TAU request, the first reject may include a first TAU reject without integrity protection received, the second request may include a second TAU request, and the second reject may include a second TAU reject without integrity protection.

In some implementations, in barring the first network element, processor 610 may be configured to bar the first network element for a period of barring time in response to receiving the first reject from the first network element. Moreover, processor 610 may be configured to transmit, via communication unit 630, a second request to the first network element after the period of barring time.

In some implementations, processor 610 may be configured to further perform other operations including: receiving, via communication unit 630, a second reject from the first network element; and switching to communications with a second type of wireless network in response to receiving the second rejects.

Alternatively or additionally, processor 610 may be configured to further perform other operations including: receiving, via communication unit 630, a second reject from the first network element; and storing an identification associated with the first network element. In some implementations, the first network element may be an eNodeB, and the identification associated with the first network element may include an identification of a cell associated with the first network element, an identification of a PLMN associated with the first network element, or a combination thereof. In some implementations, processor 610 may be further configured to perform one of the following: refraining from attempting to establish communications with the first type of wireless network; and waiting for a period of wait time before attempting to establish communications with the first type of wireless network.

In some implementations, in barring the first network element, processor 610 may be configured to bar a tracking area associated with the first network element or a first wireless network associated with the first network element in response to receiving the first reject from the first network element. In some implementations, processor 610 may be configured to further perform additional operations including starting a back-off timer and transmitting a second request to a second network element of a second wireless network after the period of barring time. In some implementations, the first request may include a first TAU request, the first reject may include a first TAU reject without integrity protection, and the second request may include a second TAU request.

In some implementations, processor 610 may be configured to further perform a number of operations. For instance, processor 610 may receive, via communication unit 630, a second reject from the second network element. Processor 610 may also stop the back-off timer. Processor 610 may further performing one or more operations pertaining to a situation of an invalid SIM card. In some implementations, the first network element may be a first eNodeB of a first PLMN, and the second network element may be a second eNodeB of a second PLMN.

Figure 7:
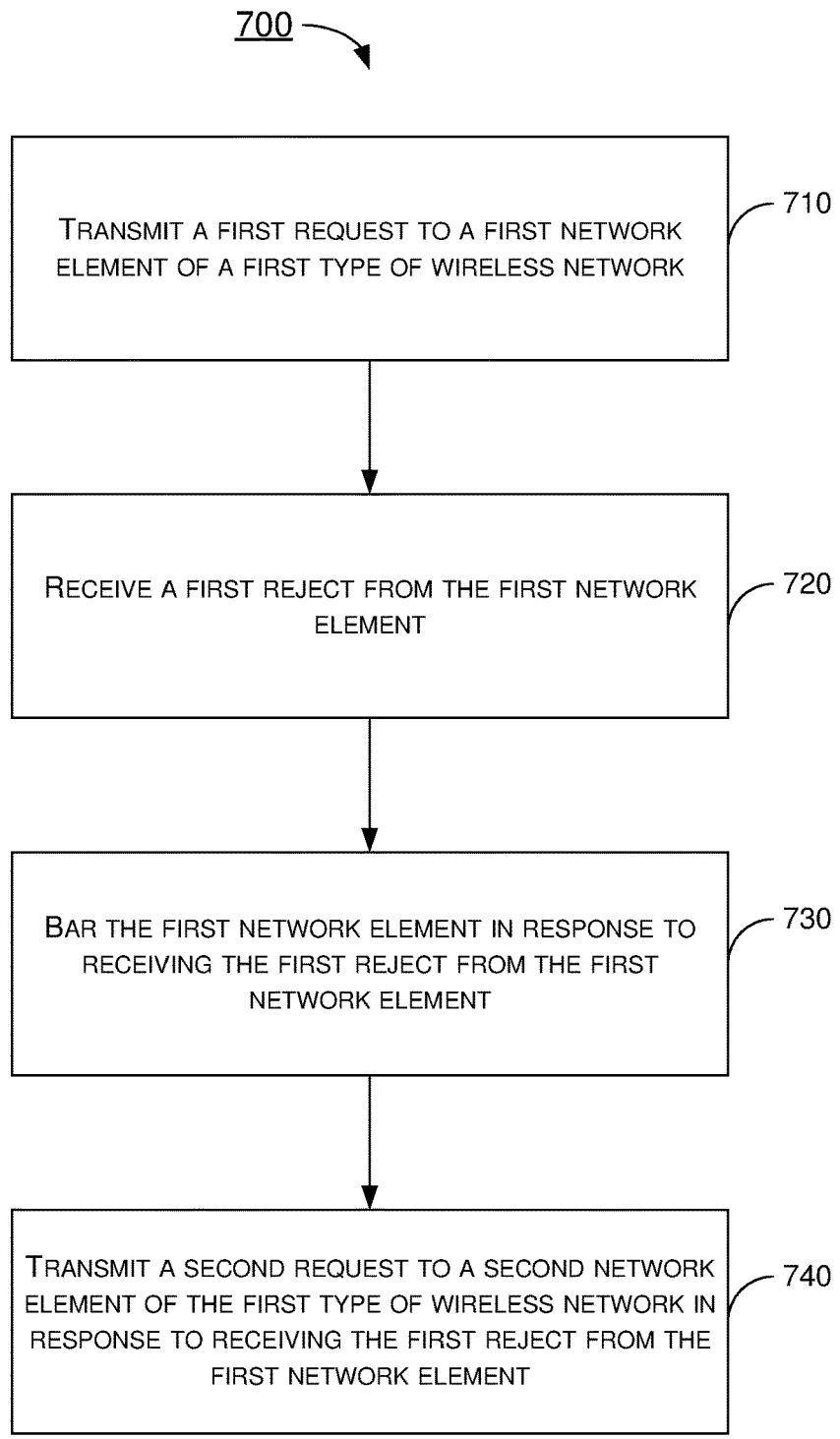
FIG. 7 is a flowchart of an example process in accordance with an implementation of the present disclosure.

FIG. 7 illustrates an example process 700 in accordance with another implementation of the present disclosure. Process 700 may be an example implementation of one or more of the solutions described above, at least partially. Process 700 may include one or more operations, actions, or functions as represented by one or more blocks such as blocks 710, 720, 730 and 740. Although illustrated as discrete blocks, various blocks of process 700 may be divided into additional blocks, combined into fewer blocks, or eliminated, depending on the desired implementation. The blocks may be performed in the order shown in FIG. 7 or in any other order, depending on the desired implementation. Process 700 may be implemented by apparatus 600 or any variations thereof. Solely for illustrative purpose and without limiting the scope of the present disclosure, process 700 is described below in the context of apparatus 600. Process 700 may begin at 710.

At 710, process 700 may involve apparatus 600 transmitting a first request to a first network element of a first type of wireless network. Process 700 may proceed from 710 to 720.

At 720, process 700 may involve apparatus 600 receiving a first reject from the first network element. Process 700 may proceed from 720 to 730.

At 730, process 700 may involve apparatus 600 barring the first network element in response to receiving the first reject from the first network element. Process 700 may proceed from 730 to 740.

At 740, process 700 may involve apparatus 600 transmitting a second request to a second network element of the first type of wireless network in response to receiving the first reject from the first network element.

In some implementations, process 700 may involve apparatus 600 additionally performing a number of operations. For instance, process 700 may involve apparatus 600 receiving a second reject from the second network element. Process 700 may also involve apparatus 600 switching to communications with a second type of wireless network in response to receiving the first and the second rejects.

Alternatively or additionally, process 700 may involve apparatus 600 additionally performing a number of other operations. For instance, process 700 may involve apparatus 600 receiving an acceptance indication from the second network element. Process 700 may also involve apparatus 600 storing an identification associated with the first network element such that first network element is not selected again when attempting to establish communications with the first type of wireless network again.

In some implementations, the first network element may be a first eNodeB, a first Node B (of a UMTS/UTRAN system) or a first Base Transceiver Station (BTS of a GSM/GERAN system) of a first PLMN, and the second network element may be a second eNodeB, a second Node B (of a UMTS/UTRAN system) or a second BTS (of a GSM/GERAN system) of the first PLMN.

In some implementations, the first request may include a first TAU request, a first routing area update (RAU) request, a first service request or a first location update request. The first reject may include a first TAU reject, a first RAU reject, a first service reject or a first location update reject without integrity protection received. The second request may include a second TAU request, a second RAU request, a second service request or a second location update request. The second reject may include a second TAU reject, a second RAU reject, a second service reject or a second location update reject without integrity protection.

Figure 8:
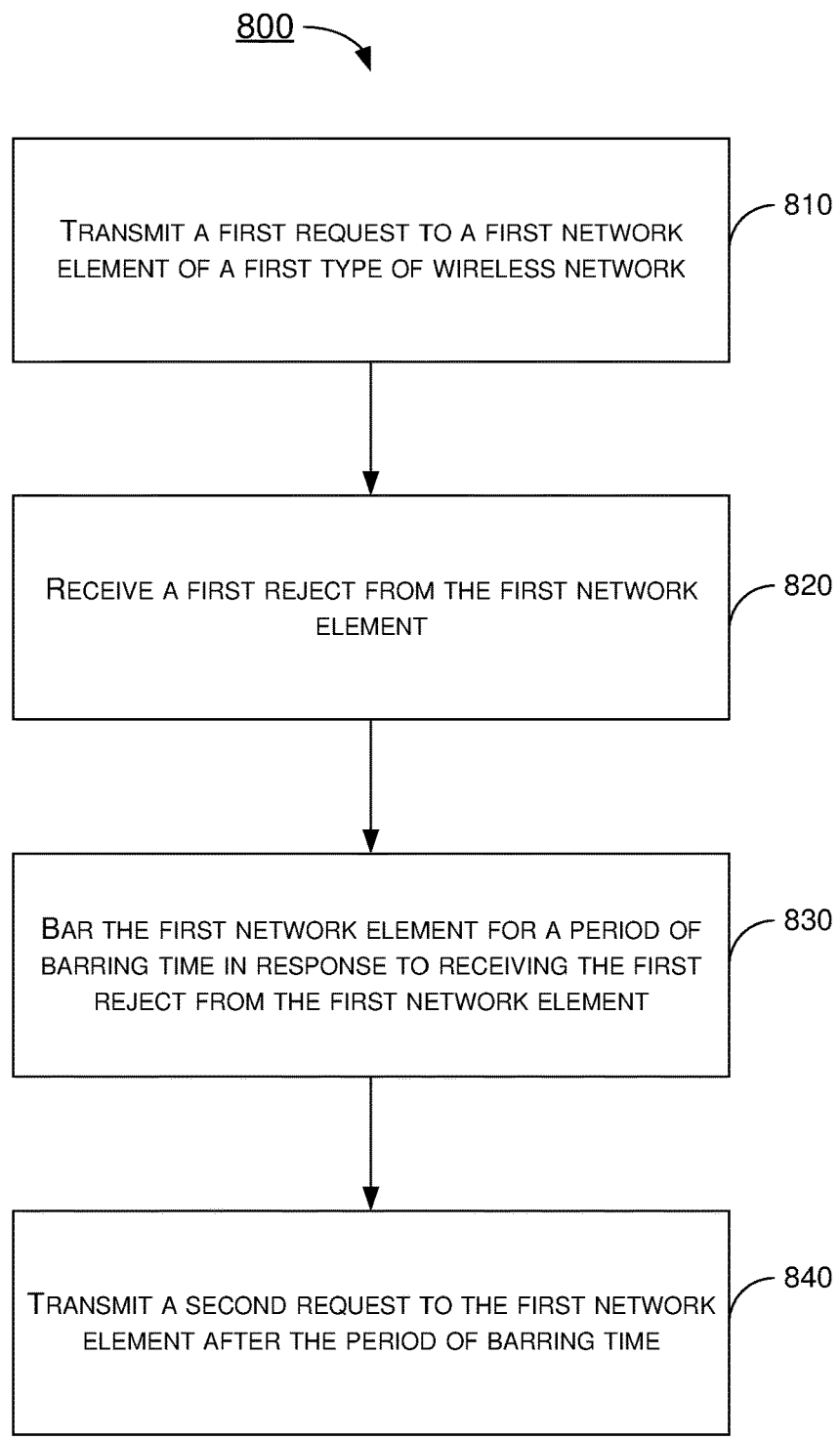
FIG. 8 is a flowchart of an example process in accordance with another implementation of the present disclosure.

FIG. 8 illustrates an example process 800 in accordance with yet another implementation of the present disclosure. Process 800 may be an example implementation of one or more of the solutions described above, at least partially. Process 800 may include one or more operations, actions, or functions as represented by one or more blocks such as blocks 810, 820, 830 and 840. Although illustrated as discrete blocks, various blocks of process 800 may be divided into additional blocks, combined into fewer blocks, or eliminated, depending on the desired implementation. The blocks may be performed in the order shown in FIG. 8 or in any other order, depending on the desired implementation. Process 800 may be implemented by apparatus 600 or any variations thereof. Solely for illustrative purpose and without limiting the scope of the present disclosure, process 800 is described below in the context of apparatus 600. Process 800 may begin at 810.

At 810, process 800 may involve apparatus 600 transmitting a first request to a first network element of a first type of wireless network. Process 800 may proceed from 810 to 820.

At 820, process 800 may involve apparatus 600 receiving a first reject from the first network element. Process 800 may proceed from 820 to 830.

At 830, process 800 may involve apparatus 600 barring the first network element for a period of barring time in response to receiving the first reject from the first network element. Process 800 may proceed from 830 to 840.

At 840, process 800 may involve apparatus 600 transmitting a second request to the first network element after the period of barring time.

In some implementations, process 800 may involve apparatus 600 additionally performing a number of operations. For instance, process 800 may involve apparatus 600 receiving a second reject from the first network element. Process 800 may also involve apparatus 600 switching to communications with a second type of wireless network in response to receiving the second rejects.

Alternatively or additionally, process 800 may involve apparatus 600 additionally performing a number of other operations. For instance, process 800 may involve apparatus 600 receiving a second reject from the first network element. Process 800 may also involve apparatus 600 storing an identification associated with the first network element.

In some implementations, the first network element may be an eNodeB, a Node B or a BTS, and the identification associated with the first network element may include an identification of a cell associated with the first network element, an identification of PLMN associated with the first network element, or a combination thereof.

In some implementations, process 800 may involve apparatus 600 additionally performing one of a number of other operations. For instance, process 800 may involve apparatus 600 refraining from attempting to establish communications with the first type of wireless network. Alternatively, process 800 may involve apparatus 600 waiting for a period of wait time before attempting to establish communications with the first type of wireless network.

In some implementations, the first request may include a first TAU request, a first routing area update (RAU) request, a first service request or a first location update request. The first reject may include a first TAU reject, a first RAU reject, a first service reject or a first location update reject without integrity protection. The second request may include a second TAU request, a second RAU request, a second service request or a second location update request.

Figure 9:
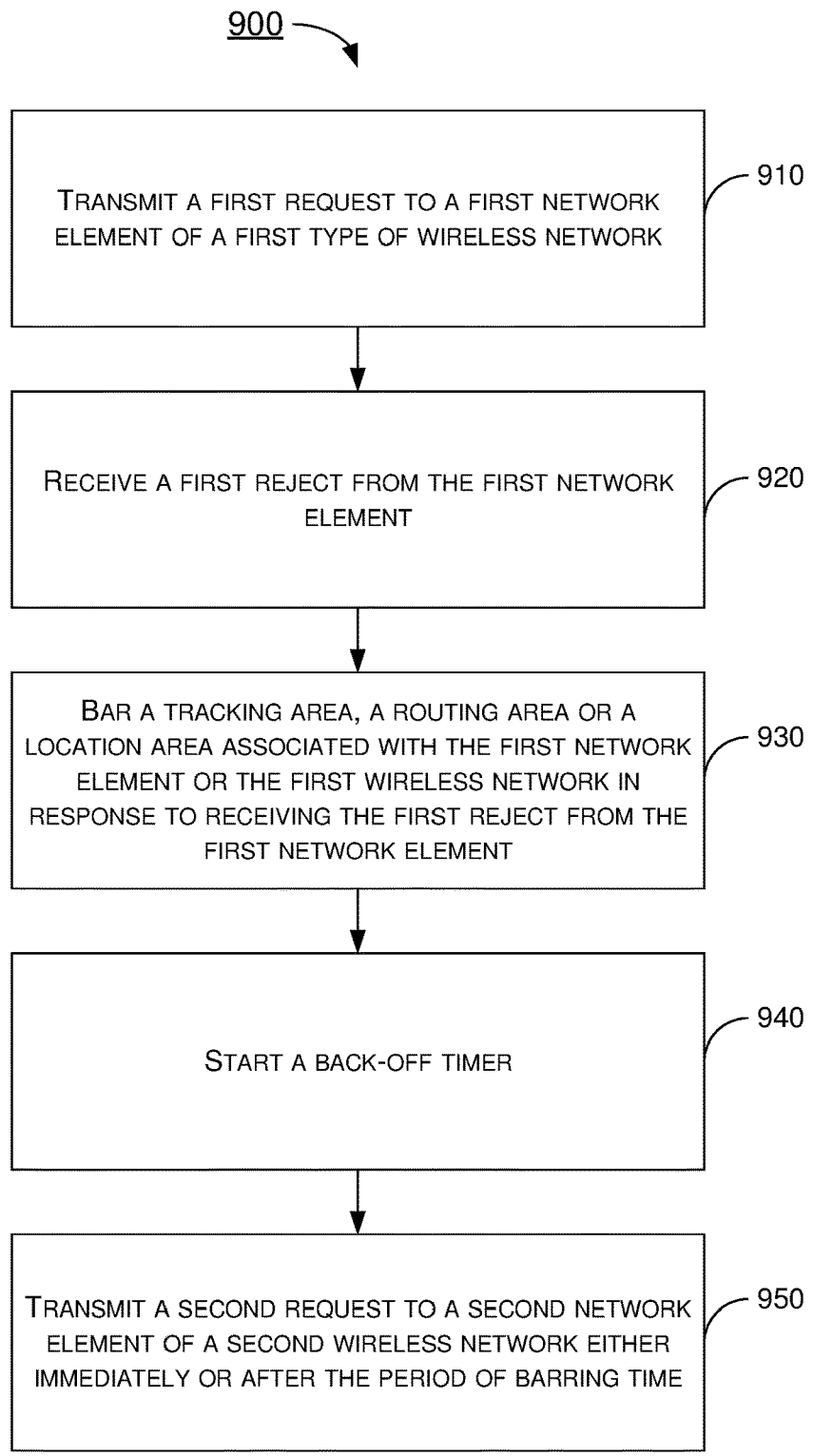
FIG. 9 is a flowchart of an example process in accordance with yet another implementation of the present disclosure.

FIG. 9 illustrates an example process 900 in accordance with yet another implementation of the present disclosure. Process 900 may be an example implementation of one or more of the solutions described above, at least partially. Process 900 may include one or more operations, actions, or functions as represented by one or more blocks such as blocks 910, 920, 930, 940 and 950. Although illustrated as discrete blocks, various blocks of process 900 may be divided into additional blocks, combined into fewer blocks, or eliminated, depending on the desired implementation. The blocks may be performed in the order shown in FIG. 9 or in any other order, depending on the desired implementation. Process 900 may be implemented by apparatus 600 or any variations thereof. Solely for illustrative purpose and without limiting the scope of the present disclosure, process 900 is described below in the context of apparatus 600. Process 900 may begin at 910.

At 910, process 900 may involve apparatus 600 transmitting a first request to a first network element of a first wireless network. Process 900 may proceed from 910 to 920.

At 920, process 900 may involve apparatus 600 receiving a first reject from the first network element. Process 900 may proceed from 920 to 930.

At 930, process 900 may involve apparatus 600 barring a tracking area, a routing area or a location area associated with the first network element or the first wireless network in response to receiving the first reject from the first network element. Process 900 may proceed from 930 to 940 and 950.

At 940, process 900 may involve apparatus 600 starting a back-off timer.

At 950, process 900 may involve apparatus 600 transmitting a second request to a second network element of a second wireless network either immediately or after the period of barring time.

In some implementations, process 900 may involve apparatus 600 additionally performing a number of operations. For instance, process 900 may involve apparatus 600 receiving a second reject from the second network element. Process 900 may also involve apparatus 600 stopping the back-off timer. Process 900 may further involve apparatus 600 performing one or more operations pertaining to a situation of a UE having an invalid SIM card.

In some implementations, process 900 may involve apparatus 600 additionally performing a number of operations. For instance, process 900 may involve apparatus 600 receiving a second reject from the second network element. Process 900 may also involve apparatus 600 stopping the back-off timer. Process 900 may further involve apparatus 600 performing one or more operations pertaining to a situation of a UE having a valid SIM card and being denied of services from at least the first wireless network and the second wireless network.

In some implementations, the first network element may be a first eNodeB of a first PLMN, and the second network element may be a second eNodeB of a second PLMN.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any multiple and/or singular terms herein, those having skill in the art can translate from the multiple to the singular and/or from the singular to the multiple as is appropriate to the context and/or application. The various singular/multiple permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method implementable by a user equipment (UE), comprising:
   transmitting a first request to a first network element of a first type of wireless network;
   receiving a first reject without integrity protection from the first network element;
   determining whether a number of times of receiving the first reject without integrity protection from the first network element exceeds a threshold number; and
   responsive to a determination that the number of times exceeds the threshold number, performing operations comprising:
      barring the first network element in response to receiving the first reject without integrity protection from the first network element; and
      transmitting a second request to a second network element of the first type of wireless network,
   wherein, in an event that a second reject is received from the second network element, the UE performs operations comprising:
      determining whether a cause number of the first reject and a cause number of the second reject are the same; and
      responsive to a determination that the cause number of the first reject and the cause number of the second reject are the same, performing either or both of:
         determining that a Subscriber Identify Module (SIM) card used in communications with the first network element and the second network element is invalid; and
         entering an operational mode in which no calls other than emergency calls can be made.

2. The method of claim 1, further comprising:
   receiving the second reject from the second network element; and
   switching to communications with a second type of wireless network in response to receiving the first and the second rejects.

3. The method of claim 1, further comprising:
   receiving an acceptance indication from the second network element; and
   storing an identification associated with the first network element such that first network element is not selected again when attempting to establish communications with the first type of wireless network again.

4. The method of claim 3, wherein the first network element comprises a first Evolved Node B (eNodeB), a first Node B or a first Base Transceiver Station (BTS) of a first Public Land Mobile Network (PLMN), and wherein the second network element comprises a second eNodeB, a second Node B or a second BTS of the first PLMN.

5. The method of claim 1, wherein the first request comprises a first tracking area update (TAU) request, a first routing area update (RAU) request, a first service request or a first location update request, wherein the first reject comprises a first TAU reject, a first RAU reject, a first service reject or a first location update reject without integrity protection received, wherein the second request comprises a second TAU request, a second RAU request, a second service request or a second location update request, and wherein the second reject comprises a second TAU reject, a second RAU reject, a second service reject or a second location update reject without integrity protection.

6. A method implementable by a user equipment (UE), comprising:
transmitting a first request to a first network element of a first type of wireless network;
receiving a first reject without integrity protection from the first network element; determining whether a number of times of receiving the first reject without integrity protection from the first network element exceeds a threshold number; and
responsive to a determination that the number of times exceeds the threshold number, performing operations comprising:
barring the first network element for a period of barring time in response to receiving the first reject without integrity protection from the first network element; and
transmitting a second request to a second network element of the first type of wireless network after the period of barring time,
wherein, in an event that a second reject is received from the second network element, the UE performs operations comprising:
determining whether a cause number of the first reject and a cause number of the second reject are the same; and
responsive to a determination that the cause number of the first reject and the cause number of the second reject are the same, performing either or both of:
determining that a Subscriber Identify Module (SIM) card used in communications with the first network element and the second network element is invalid; and
entering an operational mode in which no calls other than emergency calls can be made.

7. The method of claim 6, further comprising:
receiving the second reject from the first network element; and
switching to communications with a second type of wireless network in response to receiving the second rejects.

8. The method of claim 6, further comprising:
receiving a second reject from the first network element; and
storing an identification associated with the first network element.

9. The method of claim 8, wherein the first network element comprises an Evolved Node B (eNodeB), a Node B or a Base Transceiver Station (BTS), and wherein the identification associated with the first network element comprises an identification of a cell associated with the first network element, an identification of a Public Land Mobile Network (PLMN) associated with the first network element, or a combination thereof.

10. The method of claim 8, further comprising performing one of a number of operations, the operations comprising:
refraining from attempting to establish communications with the first type of wireless network; and
waiting for a period of wait time before attempting to establish communications with the first type of wireless network.

11. The method of claim 6, wherein the first request comprises a first tracking area update (TAU) request, a first routing area update (RAU) request, a first service request or a first location update request, wherein the first reject comprises a first TAU reject, a first RAU reject, a first service reject or a first location update reject without integrity protection, and wherein the second request comprises a second TAU request, a second RAU request, a second service request or a second location update request.

12. A method implementable by a user equipment (UE), comprising:
transmitting a first request to a first network element of a first wireless network;
receiving a first reject without integrity protection from the first network element;
counting a number of times of receiving the first reject without integrity protection from the first network element;
determining whether the number of times of receiving the first reject without integrity protection from the first network element exceeds a threshold number; and
responsive to a determination that the number of times exceeds the threshold number, performing operations comprising:
barring a tracking area, a routing area or a location area associated with the first network element or the first wireless network in response to receiving the first reject without integrity protection from the first network element;
starting a back-off timer; and
transmitting a second request to a second network element of a second wireless network either immediately or after the period of barring time,
wherein, in an event that a second reject is received from the second network element, the UE performs operations comprising:
determining whether a cause number of the first reject and a cause number of the second reject are the same; and
responsive to a determination that the cause number of the first reject and the cause number of the second reject are the same, performing either or both of:
determining that a Subscriber Identify Module (SIM) card used in communications with the first network element and the second network element is invalid; and
entering an operational mode in which no calls other than emergency calls can be made.

13. The method of claim 12, further comprising:
receiving the second reject from the second network element;
stopping the back-off timer; and
performing one or more operations pertaining to a situation in which the SIM card is invalid.

14. The method of claim 13, wherein the first network element comprises a first Evolved Node B (eNodeB) of a first Public Land Mobile Network (PLMN), and wherein the second network element comprises a second eNodeB of a second PLMN.

15. The method of claim 12, further comprising:
receiving the second reject from the second network element;
stopping the back-off timer; and
performing one or more operations pertaining to a situation in which the SIM card is valid and is denied of services from at least the first wireless network and the second wireless network.

* * * * *